UNITED STATES PATENT OFFICE.

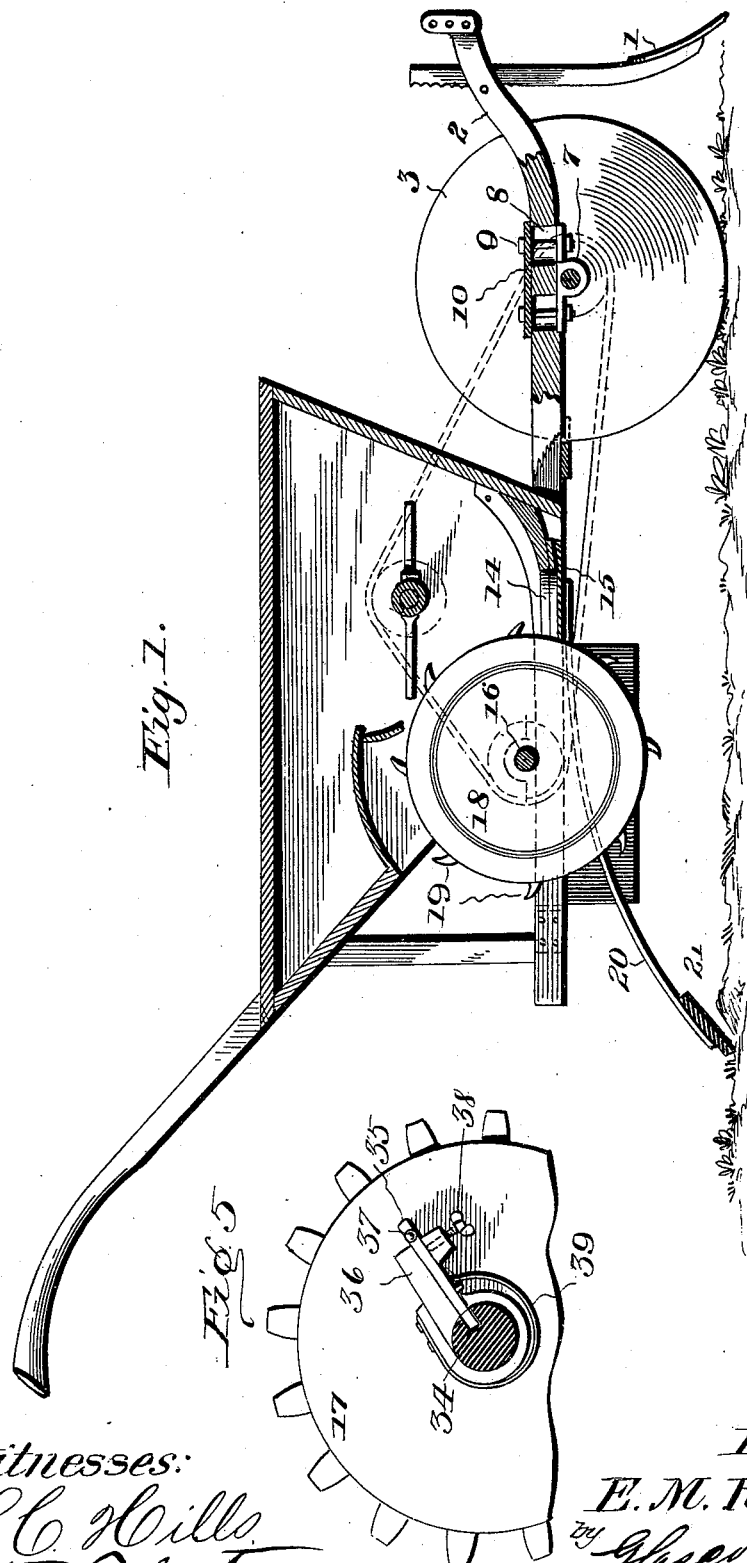

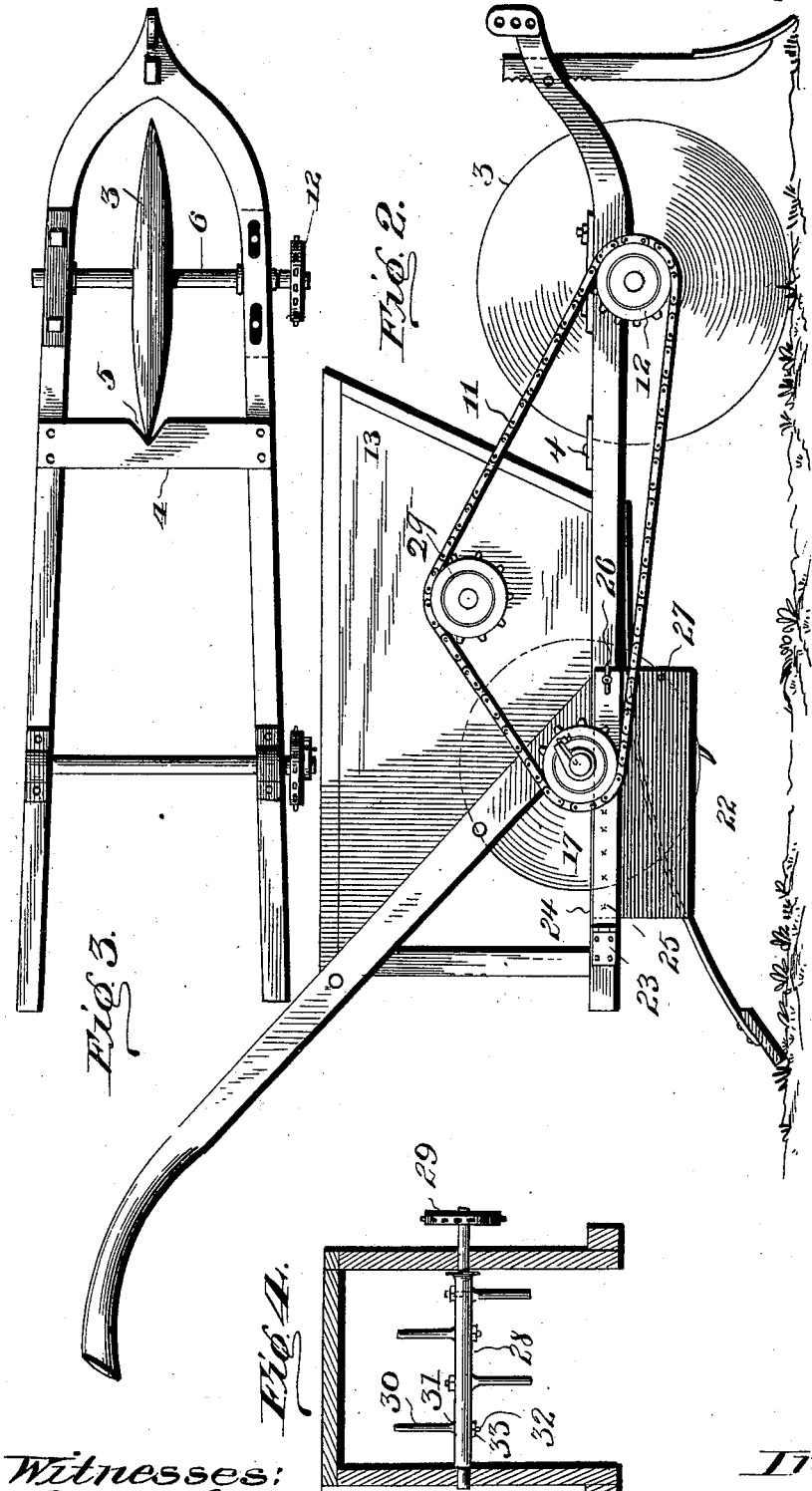

EUGENE McGHEE RUMPH, OF MARSHALLVILLE, GEORGIA.

PLANTER.

SPECIFICATION forming part of Letters Patent No. 602,364, dated April 12, 1898.

Application filed July 22, 1897. Serial No. 645,527. (No model.)

*To all whom it may concern:*

Be it known that I, EUGENE MCGHEE RUMPH, a citizen of the United States, residing at Marshallville, in the county of Macon and State of Georgia, have invented a certain new, useful, and valuable Improvement in Planters, of which the following is a full, clear, and exact description.

My invention has relation to planters; and it consists in the novel construction and arrangement of its parts, as hereinafter described.

The object of my invention is to provide a planter of simple construction, said planter having a simple and effective device for throwing the seed dropping and stirring apparatus out of gear and for readily throwing the said apparatus in gear when so desired.

The further object of my invention is to provide a planter with a double-convexed wheel, said wheel adapted to travel in the furrow behind the plow that opens the furrow and thus press or form the sides of the furrow and adapt the furrow to receive the seed.

The further object of my invention is to provide a suitable scraping device adapted to relieve the double-convexed wheel of any mud, &c., that collects on the same.

The further object of my invention is to provide suitable leather flaps which are attached to the planter and adapted to prevent the wind from blowing the seed away as it leaves the planter and before it is deposited in the furrow.

The further object of my invention is to provide a stirrer which is located in the hopper, said stirrer being of simple and especial construction.

The further object of my invention is to provide a single belt or chain adapted to transmit motion from the double-convexed wheel to the side of the dropping-wheel and to the stirrer.

The further object of my invention is to provide a simple and effective device for regulating the tension of said chain or belt.

In the accompanying drawings, Figure 1 is a longitudinal sectional view of the planter. Fig. 2 is a side elevation of the planter. Fig. 3 is a top plan view of the framework of the planter, the hopper being removed. Fig. 4 is a transverse sectional view of the hopper, showing the stirrer in detail. Fig. 5 is a side plan view of the device for throwing the said dropper and stirring apparatus in or out of gear.

The plow 1 is secured to the forward end of the frame 2 of the planter. Said plow is adapted to be perpendicularly adjusted and secured to the frame 2, and the said plow is adapted to open a furrow. The double-convex wheel 3 is journaled in the frame 2 immediately behind the plow 1. Said wheel is adapted to travel in the furrow and press the sides of the furrow, and thus smooth the sides of the furrow. The cross-piece 4 is attached at each end to the frame 2, said cross-piece 4 having in its front edge and at an intermediate point a recess 5. The periphery of the wheel 3 is adapted to pass in said recess, and the cross-piece 4 is thus adapted to relieve the wheel 3 of mud or stones that collect thereon. The wheel 3 is fixed to the axle 6, and said axle is journaled in the bearings 7 7.

Each side of the frame 2 is provided with the perpendicular elongated perforations 8 8, and the bolts 9 9 pass perpendicularly through said perforations. Said bolts at their lower ends are secured to suitable flanges of the bearings 7 7, and the bolts at their upper ends pass through suitable perforations in the plates 10 10, the plates 10 10 being on the upper surface of the framework and the bearings 7 7 being on the lower surface of the framework. Thus it will be seen that by loosening the taps on the bolts 9 9 the bearings 7 7 may be shifted laterally, and thus the position of the wheel 3 may be changed and the tension of the belt 11 may be regulated, as hereinafter described. The sprocket-wheel or belt-pulley 12 is fixed to the shaft 6. The hopper 13 is adapted to contain seed. Said hopper is located behind the wheel 3. The hopper in its bottom is provided with the opening 14. (See Fig. 1.) Said opening is normally closed by a spring-plate 15. Said plate may be made of leather or of suitable spring metal or a combination of the two. The shaft 16 is suitably journaled in the framework under the hopper 13, said shaft having at an outer end a pulley-wheel or sprocket-wheel 17, and around which the chain or belt 11 passes. The wheel 18 is fixed at an intermediate point on the shaft 16, said wheel 18 having on its periphery at regular intervals the protrusions 19 19. Said protrusions 19 19 as the wheel 18 revolves are adapted to press down the rear end of the spring-plate 15, and thus let the seed from the hopper 13 fall into the furrow that has been opened by the plow 1 and pressed by the wheel 13. The spring-arms 20 are secured to the framework of the planter at their forward ends, and the rear ends of said arms are connected by the cover-board 21. Said cover-board is adapted to throw the loose earth into the furrow and cover the seed as the planter moves along. In order to prevent the wind from blowing the seed away after it is dropped from the hopper and before it reaches the furrow, I provide the wind-boards 22 22, a board located on each side of the wheel 18. Said boards are secured at their upper edges to the frame 2 of the planter. Said boards are preferably made of leather; but they may be made of any other suitable material. The boards are preferably secured to the frame 2 by means of a hinge attached to the side of the framework. Said hinge consists of the small section 23, which is permanently fixed to the side of the framework, and the long section 24, which is provided at suitable intervals with sharpened protrusions, (indicated at 25 in Fig. 2.) The forward end of the section 24 is retained against the side of the frame 2 by means of the thumb-nuts 26. In placing the wind-boards 22 in position the thumb-nut 26 is loosened and the section 24 is swung open a trifle and the upper edge of the wind-board is placed under the section 24. Said section 24 is then swung back, and the sharpened protrusions 25 stick into the wind-boards 22, and the thumb-nut 26 is tightened up, and thus the wind-boards 22 are firmly held to the side of the framework, and they may be removed when desired. In some instances it may be desirable to connect the forward edges of the wind-boards 22 in order to retain them at a certain relative position. When this is necessary, I provide a cross-bolt, (indicated by 27 in Fig. 2.)

The shaft 28 is journaled in the hopper 13, said shaft having at an outer end a pulley-wheel or sprocket-wheel 29, around which the belt or chain 11 is adapted to pass, as indicated in Fig. 2. The stirrer-fingers 30 are arranged, as shown in Fig. 4, on the shaft 28. Each finger is provided near its base with a shoulder 31 and a threaded shank 32, that passes through a suitable perforation in the shaft 28. The fingers 30 are held firmly in position by means of the bolts 33. The fingers extend, preferably, alternately in opposite directions, as shown in Fig. 4. The device for throwing the said dropping mechanism and the stirring apparatus out of gear may be located on the wheel 17 or on the wheel 12. In the drawings it is shown as located on the wheel 17. The shaft is provided with the recess 34, and the longitudinally-movable bolt 35 is fixed in a guide 36, the end of the bolt 35 being adapted to enter the recess 34. When the end of the bolt 35 is in the recess 34, the wheel 17 is made fast with the shaft, and when it is desired to throw the wheel 17 out of gear the operator takes hold of the knob 37, pulls the bolt 35 out until its end disengages from the recess 34, and then turns the set-screw 38 until its inner end impinges against the side of the bolt 35. Thus the bolt is held out, and the wheel 37 will revolve, but the shaft supporting said wheel will not revolve. When it is desired to throw the shaft in gear, the set-screw 38 is loosened, and the spring 39 will force the end of the bolt 35 into the recess 34, and thus the shaft is thrown in gear. It is desirable to throw the shaft out of gear when the planter is being transmitted from one field to another or when it is making turns at the ends of the rows.

Having thus described my invention, what I claim as new, and desire to secure by Letters Patent, is—

1. In a machine such as described, means for throwing the shaft in and out of gear consisting of a recess made in the shaft, a longitudinally-movable bolt attached to the side of the wheel, said wheel being located on the shaft, a spring connected to said bolt and adapted to normally hold the end of the bolt in said recess, a means for securing the bolt in its outer position when the shaft is out of gear.

2. In a planter, a hopper having a suitable dropping device, a wind-board located on each side of said dropping device, a means for attaching said wind-boards to the planter consisting of a hinge fixed at one section to the framework, the other section being free and having protrusions, said wind-board adapted to rest under said free section, the protrusions of the section adapted to enter the wind-board, a device for securing the free end when the wind-board is located thereunder.

3. In a machine such as described a means for throwing the shaft in and out of gear consisting of a recess made in the shaft, a wheel located on said shaft, a perforated guide located on said wheel, a longitudinally-movable bolt located in the perforation of said guide, a set-screw located in said guide and adapted to impinge the said bolt, a spring connected to said bolt and adapted to normally hold the end of the bolt in said recess, the set-screw adapted to impinge the bolt and hold it in its outer position when the shaft is out of gear.

In testimony whereof I affix my signature in presence of two witnesses.

EUGENE McGHEE RUMPH.

Witnesses:
J. W. DIXON,
G. D. MOSSIE.